3,257,359
PROCESS FOR OBTAINING HIGH POLYMERS OF FORMALDEHYDE BY TOPOCHEMICAL REACTION UPON POLYOXYMETHYLENES
Silvio Bezzi, Padova, Italy, assignor to Montecatini Società Generale per l'Industria Mineraria e Chimica, a corporation of Italy
No Drawing. Filed Feb. 10, 1961, Ser. No. 88,274
Claims priority, application Italy, Feb. 25, 1960, 3,234/60
11 Claims. (Cl. 260—67)

An object of the present invention is the preparation of formaldehyde polymers by topochemical reaction of gaseous formaldehyde on polyoxymethylenes having a low or high degree of polymerization.

The polyoxymethylene di-hydrates (glycols) obtained by this process have a good thermal stability, which stability increases, the higher their molecular weight. They display properties of tenacity, elasticity and mouldability which make them employable as thermoplastic resins.

Their heat stability and resistance to chemical agents and, therefore, their valuable characteristics as thermoplastic resins, can be greatly improved by transforming these resins into their acetic esters according to the process described by Staudinger and coworkers (Ann., 474, 174–175 (1929)). An analogous result is obtained by treatment with the dimer of ketene.

Polyoxymethylene di-hydrates (glycols) (paraformaldehyde, α-polyoxymethylenes) have a decomposition pressure corresponding to the following equilibrium:

$$HO-CH_2-[O-CH_2-]_n-O-CH_2-OH \rightleftharpoons$$
$$HO-CH_2-[O-CH_2]_n-OH + CH_2O$$

Consequently, if the equilibrium pressure is higher than the pressure existing in the surrounding space, depolymerization occurs. Through a series of products having progressively lower degrees of polymerization, the complete decomposition into $CH_2O + H_2O$ is attained. Upon this is based the known empirical method for producing gaseous formaldehyde by pyrolysis of paraformaldehyde, as follows:

$$H-[-O-CH_2-]_n-O-H \xrightarrow{heat} H_2O + nCH_2O$$

The thermal depolymerization of polyoxymethylene di-hydrates (glycols) acording to the said mechanism is due to the instability of the two terminal semiacetalic groups, which is by far greater than that of the acetalic groups constituting the linear macromolecule. For this reason, the esterification of the terminal groups, e.g., by acetylation as described by Staudinger and coworkers, makes the products very stable. Their thermal demolition can then take place only by breakage of any of the acetalic bonds present in the molecule.

It has now been found that, between any polyoxymethylene having a high or low degree of polymerization and anhydrous formaldehyde, at any temperature (starting from the boiling point of formaldehyde and up to about 110° C. if the aldehyde is under the pressure of 1 atm., or at temperatures much higher, if the aldehyde is under a higher pressure) there occurs a topochemical reaction by which the aldehyde present in the gaseous phase reacts with the solid, thereby forming polymers having a molecular weight considerably greater than that of the starting products. The process is preferably carried out at atmospheric pressure at a temperature up to about 110° C., and advantageously from 50° to 70° C.

However, higher pressures can be used, and at higher temperatures. In such case the higher pressure is that which is exerted at the higher temperature by the employed polyoxymethylene in a closed and cold evacuated vessel. Such pressure is its decomposition pressure.

It has also been found that this topochemical reaction, the rate of which increases with the elevation of temperature, is catalyzed by organic and inorganic acids and bases which can be present in the gaseous phase, and can be solids, or liquids with or without a sensible vapor pressure, and incorporated in the solid phase. In addition to the free acids and bases, the salts, which in water give an acid or alkaline reaction by hydrolysis, also display catalytic activity.

For apparent practical reasons, and simplified operation, the use of bases is preferred over that of acids. This is the reason why the examples reported below describe the use of bases.

The process is carried out as follows:

(1) Anhydrous formaldehyde is produced by pyrolysis of α-polyoxymethylenes having a water content lower than 1%, according to any of the methods described in literature, preferably according to the methods of Spence and Will (J. Chem. Soc., 1935, 338, 340) and of Staudinger (Die hochmolekularen org. Verb., page 280).

(2) Anhydrous formaldehyde is introduced into a reactor where the topochemical reaction with polyoxymethylenes takes place, with formation of high polymers. In the reactor, the polyoxymethylene is optionally kept in movement by means of a suitable stirrer or by rotating the reactor.

The temperature and pressure in the reactor and the quantity and nature of the catalyst are selected so as to result in the desired rate of high-polymer production. The charging of the polyoxymethylenes and the discharging of the end products may be carried out continuously.

(3) The anhydrous formaldehyde leaving the reactor is liquefied in a trap kept at −80° C. with solid $CO_2$, when the process is carried out at ordinary pressure and the amount of formaldehyde introduced is higher than that of the topochemical reaction. The liquid formaldehyde is evaporated and sent back to the reactor.

Examples 1 and 2 are included for comparison only.

*Example 1.—Topochemical reaction without catalyst*

2 grams of neutral paraformaldehyde are placed into an aluminum vessel having a length of 30 cm. Said vessel is placed inside a glass tube having a diameter of 3 cm., provided with a jacket in which water is circulated at 60° C. 19 g. of anhydrous formaldehyde are introduced into the tube to contact the paraformaldehyde, at a constant rate for 3 hours. 15 g. of said formaldehyde pass over unreacted, and are recovered as liquid formaldehyde in a trap at −80° C., while 4 g. are fixed by the paraformaldehyde. Yield per hour per gram of paraformaldehyde:

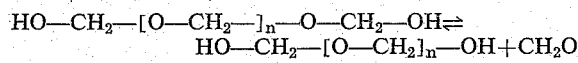

Conversion yield 21%. It should be noted that, if no anhydrification is carried out, and if the aldehyde that is developed by pyrolysis of the paraformaldehyde is introduced into the reaction tube, the production of polymers is negligible and most of the aldehyde is collected in the liquid state in the trap at 80° C.

*Example 2.—Formaldehyde not anhydrous*

Under the conditions of Example 1, at 60° C. in 4 hours, 53 g. of formaldehyde, which is not made anhydrous, are introduced into the reaction tube. 0.5 g. of this formaldehyde are fixed by the 5 g. of neutral paraformaldehyde contained in the vessel and 52 g. of formaldehyde are collected in the trap at −80° C. Yield per hour per gram of paraformaldehyde:

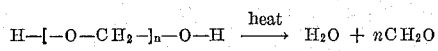

conversion yield 0.01%.

Example 3.—Anhydrous aldehyde and basic catalyst

For this test a paraformaldehyde was used which was obtained by vacuum-drying a 35% formaldehyde solution adjusted to pH of 9.6 with a conc. sodium hydroxide solution. Therefore, sodium hydroxide and sodium formate (produced by Cannizzaro's reaction) are homogeneously incorporated in this paraformaldehyde. Operating as described in Example 1, 21 g. of anhydrous formaldehyde are introduced, over a period of 1 hour and 50 minutes, into the reaction tube containing 3 g. of the described freshly prepared alkaline paraformaldehyde. 20 g. of aldehyde are fixed on the paraformaldehyde, prevailingly in the front part of the vessel. Yield per hour per gram of paraformaldehyde:

$$\frac{20}{3 \times 1.83} = 3.643$$

Conversion yield 95%.

Example 4

5 g. of the final polyoxymethylene obtained by the reaction of Example 3 were used as a starting compound in lieu of the paraformaldehyde. 30 g. of anhydrous formaldehyde are introduced into the reaction tube over a period of 3 hours. 27 g. of the formaldehyde are fixed, while 3 g. passed over and were collected in a trap in the liquid state. The other conditions are as in Examples 2 and 3. Yield per hour per gram of the starting compound polyoxymethylene:

$$\frac{27}{2 \times 3} = 1.8$$

conversion yield 90%.

Example 5

This test was carried out as in Example 3, except that the temperature of the reactor is higher, being kept at 70° C. Over a period of 3 hours, 36 g. of anhydrous formaldehyde are introduced, of which 35 g. are fixed on 4 g. of paraformaldehyde prepared as in Example 3, but used 9 days after its preparation. Yield per hour per gram of catalyst:

$$\frac{35}{3 \times 4} = 2.9$$

conversion yield 98%.

Example 6

In this test, carried out as in Example 5, alkaline paraformaldehyde obtained by precipitation from 40% alkaline solution (10 pH), filtration and drying without washing, is used. Over a period of two and a half hours, 24.5 g. of anhydrous formaldehyde are introduced, of which 23 g. are fixed on 5 g. of the alkaline paraformaldehyde. Yield per hour per gram of paraformaldehyde:

$$\frac{23}{5 \times 2.5} = 1.9$$

conversion yield 94%.

Example 7

This test was carried out as in Example 1, with variations as stated herein. 5 g. of neutral paraformaldehyde of Example 1 are treated with pyridine and kept for 24 hours in a closed vessel before use. Over a period of 2 hours at 60° C., 24 g. of anhydrous formaldehyde were introduced, of which 17 g. were fixed on the paraformaldehyde in the vessel. 6 g. were polymerized in the pipe connecting the reactor with the cooling trap, at −80° C. 1 g. was collected in the liquid state in the trap. Yield per hour per gram of paraformaldehyde:

$$\frac{17}{5 \times 2} = 1.7$$

Conversion yield 71%.

Example 8

For this test, carried out as in Example 1, 10 g. of neutral paraformaldehyde of Example 1 were used, to which was added 10% by weight of anhydrous trimethylamine. Over a period of 3 hours at 50° C., 63 g. of anhydrous formaldehyde were introduced of which 57 g. are fixed on the paraformaldehyde. Yield per hour per gram of paraformaldehyde:

$$\frac{57}{3 \times 10} = 1.9$$

Conversion yield 91%.

Example 9

This test was carried out as in Example 1, using 5 g. of neutral paraformaldehyde but also introducing into the reactor tube a slow current of anhydrous nitrogen saturated with triethylamine in a bubbler (bubbling saturator) kept at room temperature. Over a period of 4 hours, 35 g. of anhydrous formaldehyde are introduced, of which 26.5 g. are fixed on the paraformaldehyde contained in the vessel. The remaining portion polymerizes in the pipe connecting the reactor with the trap at −80° C. Yield per hour per gram of paraformaldehyde:

$$\frac{26.5}{5 \times 4} = 1.3$$

Conversion yield 76%.

Example 10

In this test 5 g. of the neutral paraformaldehyde of Example 1 were used, impregnated with a solution of 0.1 g. of sodium formate and then dried in a vacuum oven. Over a period of 3 hours, 34 g. of anhydrous formaldehyde were introduced into the reaction tube kept at 70° C.; 32 g. thereof were fixed on the paraformaldehyde contained in the vessel and 2 g. were found again in the trap at −80° C. Yield per hour per gram of paraformaldehyde:

$$\frac{32}{5 \times 3} = 2.1$$

conversion yield 94%.

Example 11

In this test 5 g. of paraformaldehyde containing 0.25 g. of sodium acetate and 0.5 g. of trimethyl amine were used. The two basic catalysts were added as indicated in Examples 10 and 8, respectively. Into the reaction tube kept at 60° C. for 2 hours, 26 g. of anhydrous formaldehyde were introduced, of which 25 g. were fixed on 5 g. of paraformaldehyde contained in the vessel. Yield per hour per gram of paraformaldehyde:

$$\frac{25}{5 \times 2} = 2.5$$

conversion yield 96%.

The products prepared by the process of this invention have an intrinsic viscosity varying from 0.5 to 4, determined in dimethylformamide at 150° C. These variations depend only to an extremely low extent upon the experimental conditions, such as reaction temperature, nature and amount of catalyst. They depend almost exclusively on the degree of anhydrification of the gaseous aldehyde introduced into the reactor. By regulating this degree, it is possible to produce formaldehyde polymers with the desired average molecular weight.

The thermal degradation (the average percent loss of weight in 10 successive operations of heating to 215° C. 4 minutes) is substantially the same for all products. It oscillates around 1% and increases slightly during the progress of the heating operations. When non-volatile catalysts are used in the reaction, a higher thermal degradation occurs than with volatile catalysts.

The melting points are between 170° C. and 185° C. The products have a good behavior as far as moulding is concerned. They have good fluidity and can be drawn into filaments and films having an excellent tenacity.

During moulding a formaldehyde odor is developed, and a little decomposiiton occurs, which is moderate when the compounds have a high intrinsic viscosity and are prepared by using, for the topochemical reaction, the polyoxymethylenes prepared in preceding reactions.

The thermal stabilization of polyoxymethylenes obtained as illustrated in Examples 1 to 11 was carried out according to the acetylation method with acetic anhydride described by Staudinger and coworkers (ibidem), or with the dimer of ketene as described in another patent application of the applicant, Serial No. 88,273, filed February 10, 1961.

*Example 12*

5 g. of polyoxymethyelene, prepared as in Example 5, and 50 g. of acetic anhydride are introduced into a glass tube which is flame-sealed under vacuum of 20 mm. The tube is immersed in an oil bath which is quickly heated up to 175° C. After about 10 minutes the content of the vial becomes transparent because most of hte polymer dissolves and the remainder gelifies while sticking to the walls. The vial is allowed to cool slowly down to 160° C. (in 30 minutes time) and then more rapidly. At 134° C. the gel begins to become opaque and at 120° C. it is completely opaque (milky); at 115° C. the dissolved polymers begin to separate. The vial is broken open, its content is heated under vacuum to recover acetic anhydride, the polymer is washed abundantly with water, suspended in water with stirring for 24 hours, and then vacuum-dried at 50° C. 5 g. of acetylated product are obtained, which differs from the starting product in that it is much softer (lower density).

No color is developed during the stabilization. Thermal degradation 0.5%. The thermal degradation of polyoxymethylene prior to stabilization was 1.2%.

*Example 13*

5 g of polyoxymethylene, prepared as in Example 4 and having an intrinsic viscosity of 1.7 and a thermal degradation of 1.5, are treated with 0.5 g of the ketene dimer and 0.1 cc. of triethylamine in a vacuum-sealed vial. The vial is then heated to 130° C. for 60 minutes, and the product is washed with acetone. 4.8 g. of a product having substantially the same viscosity as the starting product and a thermal decomposition of 0.4% are recovered.

I claim:
1. A process for preparing high polymers, having an intrinsic viscosity above 0.5 (as determined in dimethyl formamide at 150°), comprising reacting paraformaldehyde with gaseous anhydrous formladehyde in the presence of a solid phase catalyst taken from the group consisting of alkali group hydroxides, alkaline earth hydroxides, primary, secondary, and tertiary aliphatic, aromatic, cycloaliphatic, and heterocyclic amines, and salts thereof which give a basic reaction upon hydrolysis, the reaction being between the gas phase of the formaldehyde and the solid paraformaldehyde, and being carried out exclusively in the presence of solid and gaseous phases.

2. The process of claim 1, carried out at atmospheric pressure at a temperature ranging from the boiling point of the formaldehyde to about 110° C.

3. The process of claim 1, carried out at atmospheric pressure and from about 50° to 70° C.

4. A process for preparing high polymers, having an intrinsic viscosity above 0.5 (as determined in dimethyl formamide at 150°), comprising reacting paraformaldehyde with gaseous anhydrous formaldehyde in the presence of a solid phase sodium hydroxide catalyst, the reaction being between the gas phase of the formaldehyde and the solid paraformaldehyde, and being carried out exclusively in the presence of solid and gaseous phases.

5. A process for preparing high polymers, having an intrinsic viscosity above 0.5 (as determined in dimethyl formamide at 150°), comprising reacting paraformaldehyde with gaseous anhydrous formaldehyde in the presence of a solid phase alkali metal salt of formic acid catalyst, the reaction being between the gas phase of the formaldehyde and the solid paraformaldehyde, and being carried out exclusively in the presence of solid and gaseous phases.

6. A process for preparing high polymers, having an intrinsic viscosity above 0.5 (as determined in dimethyl formamide at 150°), comprising reacting paraformaldehyde with gaseous anhydrous formaldehyde in the presence of a solid phase alkali metal salt of acetic acid catalyst, the reaction being between the gas phase of the formaldehyde and the solid paraformaldehyde, and being carried out exclusively in the presence of solid and gaseous phases.

7. A process for preparing high polymers, having an intrinsic viscosity above 0.5 (as determined in dimethyl formamide at 150°), comprising reacting paraformaldehyde with gaseous anhydrous formaldehyde in the presence of a solid phase pyridine catalyst, the reaction being between the gas phase of the formaldehyde and the solid paraformaldehyde, and being carried out exclusively in the presence of solid and gaseous phases.

8. A process for preparing high polymers, having an intrinsic viscosity above 0.5 (as determined in dimethyl formamide at 150°), comprising reacting paraformaldehyde with gaseous anhydrous formaldehyde in the presence of a solid phase trimethylamine catalyst, the reaction being between the gas phase of the formaldehyde and the solid paraformaldehyde, and being carried out exclusively in the presence of solid and gaseous phases.

9. A process for preparing high polymers, having an intrinsic viscosity above 0.5 (as determined in dimethyl formamide at 150°), comprising reacting alpha-polyoxymethylene with gaseous anhydrous formaldehyde in the presence of a solid phase catalyst taken from the group consisting of alkali group hydroxides, alkaline earth hydroxides, primary, secondary, and tertiary aliphatic, aromatic, cycloaliphatic, and heterocyclic amines, and salts thereof which give a basic reaction upon hydrolysis, the reaction being between the gas phase of the formaldehyde and the solid alpha-polyoxymethylene, and being carried out exclusively in the presence of solid and gaseous phases.

10. A process for preparing high polymers, having an intrinsic viscosity above 0.5 (as determined in dimethyl formamide at 150°), comprising reacting alpha-polyoxymethylene, taken from the group consisting of paraformaldehyde and reaction products thereof with formaldehyde, with gaseous anhydrous formaldehyde in the presence of a solid phase catalyst taken from the group consisting of alkali group hydroxides, alkaline earth hydroxides, primary, secondary, and tertiary aliphatic, aromatic, cycloaliphatic, and heterocyclic amines, and salts thereof which give a basic reaction upon hydrolysis, the reaction being between the gas phase of the formaldehyde and the solid alpha-polyoxymethylene, and being carried out exclusively in the presence of solid and gaseous phases.

11. A process for preparing high polymers, having an intrinsic viscosity above 0.5 (as determined in dimethyl formamide at 150°), comprising reacting paraformaldehyde with gaseous anhydrous formaldehyde in the presence of a solid phase sodium formate catalyst, the reaction being between the gas phase of the formaldehyde and the solid paraformaldehyde, and being carried out exclusively in the presence of solid and gaseous phases.

References Cited by the Examiner

UNITED STATES PATENTS

| | | | |
|---|---|---|---|
| 2,296,249 | 9/1942 | Austin et al. | 260—67 |
| 2,551,365 | 5/1951 | Craven | 260—67 |
| 2,768,994 | 10/1956 | MacDonald | 260—67 |
| 2,795,571 | 6/1957 | Schneider | 260—67 |
| 2,992,277 | 7/1961 | Porter | 260—615.5 |
| 3,007,897 | 11/1961 | Behrends et al. | 260—67 |

OTHER REFERENCES

Kohlschutter et al., Z. Physik. Chem., vol. B16 (1932), pp. 284–302; Engilsh translation available.

Walker, Formaldehyde, A.C.S. Monograph 120 (1953), Reinhold Pub. Co., New York, pp. 204–212.

WILLIAM H. SHORT, *Primary Examiner.*

MILTON STERMAN, LOUISE P. QUAST,
*Examiners.*

R. J. BUTTERMARK, L. M. MILLER,
*Assistant Examiners.*